(12) United States Patent
McDonnell

(10) Patent No.: US 10,661,884 B2
(45) Date of Patent: *May 26, 2020

(54) OBLIQUE BLENDED WING BODY AIRCRAFT

(71) Applicant: Advanced Product Development, LLC, St. Louis, MO (US)

(72) Inventor: William Randall McDonnell, Las Vegas, NV (US)

(73) Assignee: Advanced Product Development, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/557,152

(22) Filed: Aug. 30, 2019

(65) Prior Publication Data

US 2019/0382098 A1    Dec. 19, 2019

Related U.S. Application Data

(63) Continuation of application No. 15/232,510, filed on Aug. 9, 2016, now Pat. No. 10,435,137, which is a
(Continued)

(51) Int. Cl.
*B64C 3/10* (2006.01)
*B64C 30/00* (2006.01)
*B64C 39/10* (2006.01)

(52) U.S. Cl.
CPC ............... *B64C 3/10* (2013.01); *B64C 30/00* (2013.01); *B64C 39/10* (2013.01); *B64C 2039/105* (2013.01); *Y02T 50/12* (2013.01)

(58) Field of Classification Search
CPC ........... B64C 30/00; B64C 39/10; B64C 3/10; Y02T 50/12
See application file for complete search history.

(56) References Cited

U.S. PATENT DOCUMENTS 2,650,780 A * 9/1953 Northrop ................ B64C 39/10
244/13
3,009,670 A * 11/1961 Williams .................. B64C 3/40
244/46

(Continued)

OTHER PUBLICATIONS

P. Li, R. Seebass, H. Sobieczky, "Oblique Flying Wing Aerodynamics," 1st AIAA Theoretical Fluid Mechanics Meeting AIAA 96-2120 (11 pages), Jun. 1996.
(Continued)

*Primary Examiner* — Medhat Badawi
(74) *Attorney, Agent, or Firm* — Sandberg Phoenix & von Gontard, P.C.

(57) ABSTRACT

An oblique wing aircraft designed for reduced surface area to volume ratio. The aircraft has an oblique wing comprising a forward swept wing segment and an aft swept wing segment. A center oblique airfoil section connects the forward and aft swept wing segments. The center oblique airfoil section has a larger chord near its centerline than the chords of either of the forward or aft swept wing segments. The chord of the center oblique airfoil section tapers down more rapidly than the forward or aft wing segments as the center oblique airfoil section extends outboard toward the forward and aft swept wings. Preferably, the aircraft is an all-wing aircraft.

22 Claims, 6 Drawing Sheets

Related U.S. Application Data continuation of application No. 13/784,438, filed on Mar. 4, 2013, now Pat. No. 9,440,740, which is a continuation of application No. 12/675,165, filed as application No. PCT/US2008/074795 on Aug. 29, 2008, now Pat. No. 8,408,490.

(60) Provisional application No. 60/935,758, filed on Aug. 29, 2007.

(56) References Cited

U.S. PATENT DOCUMENTS

| | | | | |
|---|---|---|---|---|
| 3,028,122 | A * | 4/1962 | Riebe | B64C 9/38 244/46 |
| 3,454,241 | A * | 7/1969 | Riemerschmid | B64C 29/0075 244/55 |
| 3,737,121 | A * | 6/1973 | Jones | B64C 3/40 244/13 |
| 3,761,041 | A * | 9/1973 | Putman | B64C 39/10 244/13 |
| 3,820,743 | A | 6/1974 | Young | |
| 3,971,535 | A * | 7/1976 | Jones | B64C 3/40 244/46 |
| 4,053,125 | A * | 10/1977 | Ratony | B64C 39/068 244/46 |
| 4,132,374 | A * | 1/1979 | Abell | B64C 3/40 244/46 |
| 4,139,172 | A * | 2/1979 | Miller | B64C 3/38 244/45 R |
| 4,146,199 | A * | 3/1979 | Wenzel | B64C 39/068 244/36 |
| 4,417,708 | A * | 11/1983 | Negri | B64C 3/40 244/45 R |
| 4,691,878 | A * | 9/1987 | Vaughan | B64C 3/56 244/49 |
| 4,786,008 | A * | 11/1988 | Corbett | B64C 39/024 244/53 R |
| 4,836,470 | A * | 6/1989 | Criswell | B64C 39/10 244/12.5 |
| 4,842,218 | A * | 6/1989 | Groutage | B64C 39/024 244/137.4 |
| D314,366 | S * | 2/1991 | Waaland | 244/36 |
| 5,114,097 | A * | 5/1992 | Williams | B64C 1/0009 244/117 R |
| 5,337,974 | A * | 8/1994 | Rumberger | B64C 3/40 244/39 |
| 5,671,898 | A * | 9/1997 | Brown | B64C 3/38 244/46 |
| 5,730,391 | A * | 3/1998 | Miller, Jr. | B63B 1/20 114/61.27 |
| 5,909,858 | A * | 6/1999 | Hawley | B64C 3/00 244/130 |
| 5,984,231 | A * | 11/1999 | Gerhardt | B64C 5/04 244/46 |
| 5,992,796 | A * | 11/1999 | Smith | B64C 1/26 244/45 A |
| 6,568,632 | B2 * | 5/2003 | Page | B64C 1/0009 244/120 |
| 6,601,795 | B1 * | 8/2003 | Chen | B64C 3/40 244/46 |
| 6,669,137 | B1 * | 12/2003 | Chen | B64C 3/40 244/7 R |
| 6,745,979 | B1 * | 6/2004 | Chen | B64C 3/40 244/46 |
| 6,923,404 | B1 * | 8/2005 | Liu | B64C 3/40 244/46 |
| 9,327,822 | B1 * | 5/2016 | Melton | B64C 3/385 |
| 9,522,727 | B2 * | 12/2016 | Pflug | B64C 23/04 |
| 9,694,908 | B2 * | 7/2017 | Razroev | B64C 29/0033 |
| 9,988,148 | B2 * | 6/2018 | Alber | B64C 29/02 |
| 2005/0173592 | A1 * | 8/2005 | Houck, II | B63B 1/248 244/45 R |
| 2005/0211827 | A1 * | 9/2005 | Barocela | F42B 15/10 244/46 |
| 2005/0230531 | A1 * | 10/2005 | Horinouchi | B64C 3/10 244/47 |
| 2006/0175463 | A1 * | 8/2006 | McGeer | B64C 25/68 244/1 R |
| 2009/0026321 | A1 * | 1/2009 | Sarh | B64C 3/54 244/218 |
| 2010/0243795 | A1 * | 9/2010 | McDonnell | B64C 30/00 244/36 |
| 2012/0037751 | A1 * | 2/2012 | Zha | B64C 1/1484 244/52 |
| 2014/0239117 | A1 * | 8/2014 | Sommer | B64C 39/12 244/48 |
| 2016/0375981 | A1 * | 12/2016 | McDonnell | B64C 3/10 244/13 |

OTHER PUBLICATIONS

NASA Ames, "Oblique Flying Wing SST," Boeing and Douglas Perspective (35 pages), Aug. 1992.
Richard Petersen, Vic Peterson, Tom Gregory, "Oblique All Wing Aircraft," NASA Ames Research Center Oblique Wing Technology Program (31 pages), Jan. 1992.
"Top Academic Argues for Oblique Flying Wing as HSCT Solution," Aerospace Daily, p. 230, May 1994.
A. Richard Seebass, "The Prospects for Commercial Transport at Supersonic Speeds," Sixth Biannual William Frederick Durand Lecture, AIAA-94-0017 (27 pages), May 1994.
M. Waters, M. Ardema, C. Roberts, I. Kroo, "Structural and Aerodynamic Considerations for an Oblique All-Wing Aircraft," AIAA Aircraft Design Systems Meeting, AIAA 92-4220 (38 pages—not complete), Aug. 1992.
D.W. Elliott, P.D. Hoskins, R.F. Miller, "A Variable Geometry HSCT," AIAA Aircraft Design Systems and Operations Meeting, AIAA 91-3101 (14 pages), Sep. 1991.
Boomerang Model 202-11 plan view and Rutan Boomerang Wikipedia article, pp. 1-3, Jun. 2012.
Alexander J. M. Van Der Velden, "The Conceptual Design of a Mach 2 Oblique Flying Wing Supersonic Transport," NASA Contractor Report 177529 (38 pages), May 1989.
I. Kroo, "The Aerodynamic Design of Oblique Wing Aircraft," AIAA/AHS/ASEE Aircraft Systems Design and Technology Meeting, AIAA-86-2624 (18 pages), Oct. 1986.
Pei Li, Richard Seebass, Helmut Sobieczky, "The Oblique Flying Wing as the New Large Aircraft," American Institute of Aeronautics and Astronautics, Inc., and the International Council of the Aeronautical Sciences, with permission (14 pages), 1996.
Alexander J.M. Van Der Velden, "Aerodynamic Design and Synthesis of the Oblique Flying Wing Supersonic Transport," Suddar 621, Department of Aeronautics and Astronautics Stanford University (307 pages), Jun. 1992.
Pei Li, Richard Seebass, Helmut Sobieczky, "The Sonic Boom of an Oblique Flying Wing SST," reprint of paper CEAS/AIAA-95-107 (8 pages), 1995.
Desktop Aeronautics, Inc., "Oblique Flying Wings: An Introduction and White Paper," internet-published paper (51 pages), Jun. 2005.
David S. Harvey, "DARPA's UAV ideas take wing," Unmanned Vehicles, Jul.-Aug. 2007, pp. 26-27.
Michael J. Hirschberg, David M. Hart, Thomas J. Beutner, "A Summary Of A Half-Century of Oblique Wing Research," 45th AIAA Aerospace Sciences Meeting and Exhibit, AIAA Paper 2007-150 (35 pages), Jan. 2007.
R.H. Liebeck, "Design of the Blended-Wing-Body Subsonic Transport," 2002 Wright Brothers Lecture, American Institute of Aeronautics and Astronautics, AIAA-2002-0002, reprinted in Journal Of Aircraft, vol. 41, No. 1, Jan.-Feb. 2004, pp. 10-25.
International Search Report and the Written Opinion of the International Searching Authority, PCT/US2008/074795, dated Mar. 20, 2009.

* cited by examiner

OBLIQUE BLENDED WING BODY AIRCRAFT

CROSS-REFERENCE TO RELATED APPLICATIONS

This application is a continuation of U.S. patent application Ser. No. 15/232,510, filed Aug. 9, 2016, which is a continuation U.S. patent application Ser. No. 13/784,438, filed Mar. 4, 2013, now U.S. Pat. No. 9,440,740, which is a continuation of U.S. National Stage application Ser. No. 12/675,165, filed Feb. 25, 2010, now U.S. Pat. No. 8,408,490, which is a 35 U.S.C. § 371 of International Application No. PCT/US08/074795, filed Aug. 29, 2008, which in turn claims priority to U.S. Provisional Patent Application Ser. No. 60/935,758, filed Aug. 29, 2007, all of which are hereby incorporated by reference.

STATEMENT REGARDING FEDERALLY SPONSORED RESEARCH

Not Applicable.

TECHNICAL FIELD

The present invention relates to flying objects designed to fly fast enough that compressibility drag becomes significant.

BACKGROUND ART

In the past people have proposed blended wing body aircraft like the B-2 bomber and people have also proposed all flying Oblique Wings as shown in FIG. 1 with an elliptical or near elliptical planform.

Blended Wing Body aircraft like the B-2 achieve lower drag than a pure flying wing by minimizing the surface area exposed to the airflow. They do this by having a center body that is as close as practical to circular in planform but usually with a pointed nose on the front to reduce compressibility drag and with wings attached to the sides to increase the wingspan for reduced induced drag which is drag due to creating lift. A wing with a circular planform has the least amount of surface area to internal volume for the same reason that a circle has the smallest circumference to the enclosed area or a sphere has the largest volume to surface area. The Blended Wing Body aircraft also can have inherent pitch stability at a farther aft center of gravity due to the aft swept wings that can act like horizontal tail surfaces. Further background of blended wing body aircraft is given in R. H. Liebeck, "Design of the Blended-Wing-Body Subsonic Transport," 2002 Wright Brothers Lecture, American Institute of Aeronautics and Astronautics, AIAA-2002-0002, reprinted in Journal Of Aircraft, Vol. 41, No. 1, January-February 2004, pp. 10-25, hereby incorporated by reference.

Oblique flying wing aircraft that have been proposed in the past were elliptical or near elliptical wings that flew at different oblique angles to trade off compressibility and induced drag at different mach numbers like that shown in planform in FIG. 1. The design shown in FIG. 1 has remained relatively unchanged since it was proposed by R. T. Jones in the 1950's. The history of oblique wing research is found in M. Hirschberg, D. Hart, and T. Beutner, "A Summary of a Half-Century of Oblique Wing Research," 45th AIAA Aerospace Sciences Meeting and Exhibit, AIAA Paper 2007-150, January 2007, hereby incorporated by reference.

At low speed the aircraft could fly in a low speed direction 2 close to a zero sweep angle for minimum induced drag which is the drag due to lift. At high speed, compressibility drag becomes more important and eventually dominant. Compressibility drag due to lift and compressibility drag due to volume can however be reduced by spreading the lift and volume farther in the direction of flight. Thus as the aircraft flew faster and faster the wing was swept to a higher and higher sweep angle to trade off the optimum induced versus compressibility drag characteristics. The component of air velocity perpendicular to the wing could remain subsonic effectively making the wing and air interact very similar to a wing flying subsonically. Engines 6 were generally envisioned to be mounted in rotating pods on the bottom of the wing. The small chord length and limited thickness of the wing made integrating the engine into the wing more difficult and in order to have an aircraft with a thick enough wing that passengers could stand up in a cabin the aircraft had to be very large carrying approximately six hundred passengers. The largest circle possible 5 is shown drawn over (inscribed in) the planform of the aircraft shown in FIG. 1. As may be seen, it is a small circle encompassing only a small percentage of the planform area of the aircraft. From this we can determine that this aircraft has a large amount of surface area to internal volume ratio and as such will have a lot of skin friction drag in both high and low speed configurations. Also because the circle is small and there is a finite limit to the thickness to chord length of the airfoil used on this flying wing, we know the thickness of the vehicle will not be very large making packaging of the vehicle more difficult or requiring the vehicle to be larger than might be desirable such as to incorporate a cabin for passengers or other components.

In the past people have also proposed oblique wing aircraft that had conventional fuselages as well. Problems occurred due to the interaction between the wing and fuselage, and the high compressibility drag due to volume of the fuselage caused most designers to look to all-wing configurations.

Oblique flying wing aircraft have more surface area to volume than a Blended Wing Body aircraft like the B-2 stealth bomber and they also need the center of gravity very far forward or they are unstable and hard to control and generally have to be provided with an advanced artificial stabilization system.

SUMMARY OF THE INVENTION

The present invention combines the benefits of a Blended Wing Body aircraft and an all flying Oblique Wing Aircraft. The invention combines the low wetted area and natural stability benefits of a blended wing body aircraft with the variable sweep and low compressibility drag benefits of an Oblique flying wing.

BEST MODE FOR CARRYING OUT THE INVENTION

Figure 2:
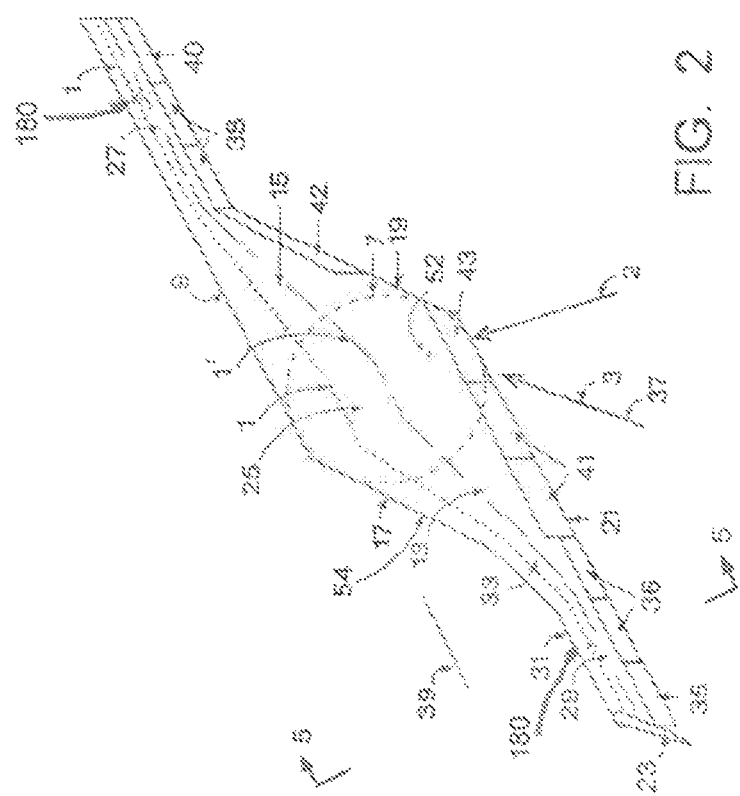
FIG. 2 is a plan view of one embodiment of the present invention.
Figure 5:
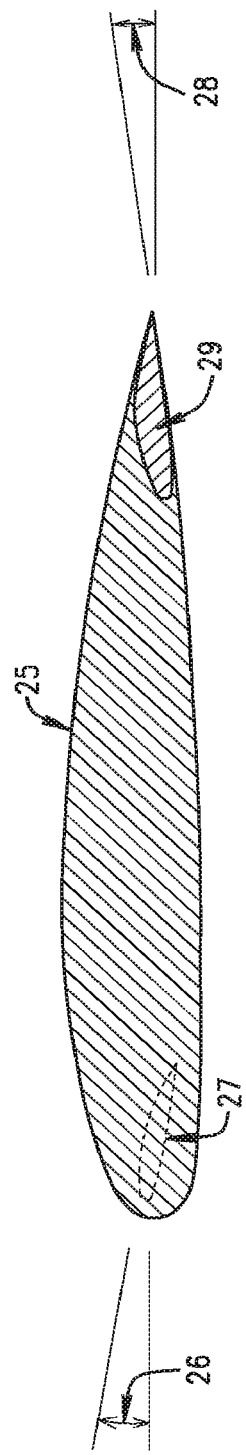
FIG. 5 is a cross-sectional cut from FIG. 2 looking inboard from the left wing parallel to the leading edge 9, as indicated by line 5-5 of FIG. 2.

Referring to FIG. 2, a center airfoil section, called herein the "center body" 25, is designed by starting off with a circle 7 as shown in dashed lines at the center of the aircraft planform. Tapering transition areas 15 and 13 are added on either side of the circle to form left and right sides of the center body 25 and a forward swept wing 27 and an aft swept wing 29 are then attached to the center body 25 as shown in FIG. 2 plan view. The center body 25 is itself a wing segment with airfoil cross-sections. The forward swept wing 27 preferably has a leading edge 9 that is an extension of the leading edge of the center body's forward swept transition area 15. The aft swept wing 29 has its aerodynamic center behind the pitch axis 39 so it is helpful in stabilizing the vehicle in pitch about the pitch axis 39. The pitch axis 39 for this configuration is defined parallel to the quarter chord of the forward swept wing but passing through the vehicle center of gravity as shown in FIG. 2. Preferably the aft swept wing aerodynamic center is farther behind the pitch axis 39 than the forward swept wing aerodynamic center is in front of this pitch axis. In order to balance the aircraft in pitch and roll with minimal control surface deflections for lowest drag, the aft swept wing 29 for the configuration shown in FIG. 2 preferably has a positive dihedral and a lower incidence relative to the forward swept wing 27. For yaw trim at high sweep angles, a vertical fin 23 can be located at the end of the aft swept wing 29. The current invention has less of a problem with the oblique wing wanting to yaw to lower sweep angles than with a traditional oblique wing aircraft as will be described later. However if, for the particular design chosen, the aircraft still wants to rotate to lower sweep angles, then more vertical fin 23 area should be located above the wing than below. This fin area above the wing generates an inboard force (in this case to the right) to keep the aircraft from naturally wanting to rotate back to a lower sweep angle. By having the fin located more above the wing, it also acts as a winglet to reduce induced drag since an upward facing winglet will naturally produce an inboard force and a fin located above the wing pushing inboard will naturally tend to act as a winglet by preventing high pressure air below the wing from moving around the tip of the wing and onto the top surface of the wing. If the aft swept wing 30 is swept far aft such as shown in the configuration shown in FIG. 3, the aircraft can be more inherently stable under some circumstances or the center of gravity can be farther aft for the same amount of natural stability. However, with the aft swept wing oriented as shown in FIG. 2, the vehicle has a higher aspect ratio and has the potential for lower induced drag at the same forward swept wing sweep angles. At low speeds, both forward and aft facing wings of the configuration shown in FIG. 2 can have zero sweep making them more adaptable to using laminar flow airfoils, as shown in FIG. 5.

It will be seen that a forward swept wing segment comprising the forward wing 27 and the half of the center body 25 on the side of the forward wing 27 provides half the aircraft wingspan, and an aft swept wing segment comprising the aft wing 29 and the half of the center body on its side of the aircraft provide the other half of the aircraft wingspan.

The leading and trailing edges of the forward and aft swept wing segments from the centerline out to the 80% wingspan, as indicated at 180, are all swept in the same direction relative to the direction of flight. The leading and trailing edge sweep angles at the 80% wingspan locations 180 are all smaller than the maximum sweep angle of the leading edge of the aft swept wing inboard of the 80% wingspan position and also smaller than the maximum sweep angle of the trailing edge of the forward swept wing inboard of the 80% wingspan position.

Another way to think of the current invention is a low aspect ratio oblique all wing aircraft to achieve a low surface area to volume ratio but with the addition of wing tip extensions to achieve more inherent pitch stability and achieve the necessary wingspan for low induced drag which is drag due to generating lift. These shorter chord wing tip extensions are designed to generate much more lift per square foot of planform area than the center oblique wing section to compensate for their smaller chord. They do this by operating at a higher lift co-efficient usually from increased angle of attack due to either 1) their position in the upwash field downstream of the other lifting surfaces or 2) increased pitch angle due to increased incidence or 3) increased pitch from the dihedral on the forward swept wing. The wingtip extensions also usually generate more lift co-efficient because the centerbody usually will use a reflex airfoil which has a lower lift co-efficient but provides a desirable nose up pitching moment. The wing tip extensions can also generate a higher lift co-efficient with deflected trailing edge flaps or other lift augmenting devices though this is generally not the preferred approach. The wingtip extensions should be designed to provide twice (and preferably three times) or more the average lift per square foot of wing area as the center oblique wing section but lower numbers such as 30% to 60% more lift per square foot may make sense for some designs wanting a very high level of maneuver capability before stalling the wingtip extensions.

A. How to Lay Out the Planform of the Current Invention

FIG. 2 shows a plan view of one embodiment of the current invention.

Figure 1:
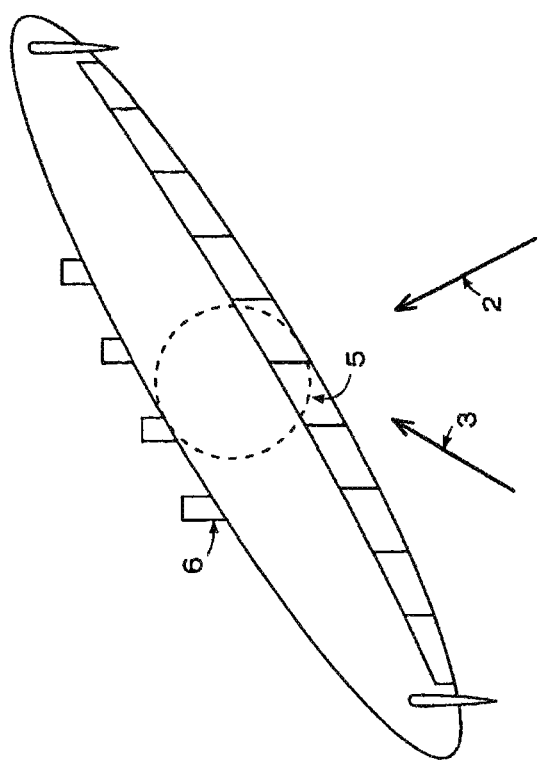
FIG. 1 is a plan view of a traditional Oblique All-Wing Aircraft (prior art).

The largest possible circle 7 has been drawn over (inscribed in) the aircraft planform. Relative to previous Oblique Wing aircraft as shown in FIG. 1, a much larger percentage of the planform area fits inside this circle resulting in a much lower ratio of surface area to internal volume for this configuration and thus lower skin friction drag. As a result designing an optimum configuration of the current invention can start by drawing a circle. On either side of the circle we then draw lines tangential to the circle and rapidly tapering down going forward and to the right, and aft and to the left (or vice versa for a mirror image layout) in order to create the transition areas 13 and 15 on left and right sides of the center body 25. Finally, the wings 29 or 30 and 27 are attached to the left and right sides of the center body 25. The faster the chord of the wing tapers down in transition areas 13 and 15 on either side of the circle 7, the lower, and better, the surface area to volume ratio will be. However the slower it tapers down generally the lower the compressibility drag associated with volume can be. As a result this is a design trade. If the top speed of the aircraft is very high then the wing chord taper in the transition areas 13 and 15 will ideally be more gradual, and the slower the top speed of the aircraft, the faster the chord will taper down. Even for a high speed vehicle the area inside the center circle should be more than 25% of the total planform area and typically 33% or more of the planform area. For a lower speed vehicle it should be more than 40% and preferably better than 50% of the total planform area. Above 55 to 60% is approaching an upper limit to a practical design that is trying to minimize compressibility drag. The rate of taper up or taper down of chord length is defined by the difference in sweep angles between the leading and trailing edge surfaces (9 versus 19 and 17 versus 21) in plan view. In the configurations shown the airfoil sections chosen for the aircraft to describe the aircraft outer mold line are laid out perpendicular to the pitch axis 39. If the vehicle is used for military purposes and radar stealth is a consideration then the leading edges like 9 and 31 can be parallel to trailing edges like 21, and leading edge 54 can be parallel to trailing edge 19 in order to reduce the number of radar spikes incorporated in the design.

The faster the vehicle is designed to fly, the higher the sweep angle is desired on the leading edge 9 of the forward swept wing 27 and its transition area 15 relative to the direction of flight. However, generally the sweep angle on the leading edge 17 of the transition area 13 should remain less than 90 degrees so that it stays a leading edge both in high and low speed flight. Likewise, the trailing edge 19 of the forward swept transition area 15 should be swept less than 90 degrees so that it stays a trailing edge in both high and low speed flight angles. As a result, the taper down angle or angle between the leading 9 and trailing 19 edges of the transition area 15 generally should be less than 90 degrees, and preferably less than 85 degrees, minus the desired maximum sweep angle of the leading edge 9 for the forward swept transition area 15 relative to the direction of flight. Similarly, the taper down angle or angle between the leading 17 and trailing 21 edges of the aft swept transition area 13 should be less than 90 degrees, and preferably less than 85 degrees, minus the desired maximum sweep angle relative to the direction of flight of the trailing edge 21 for the aft swept transition area 13.

Figure 3:
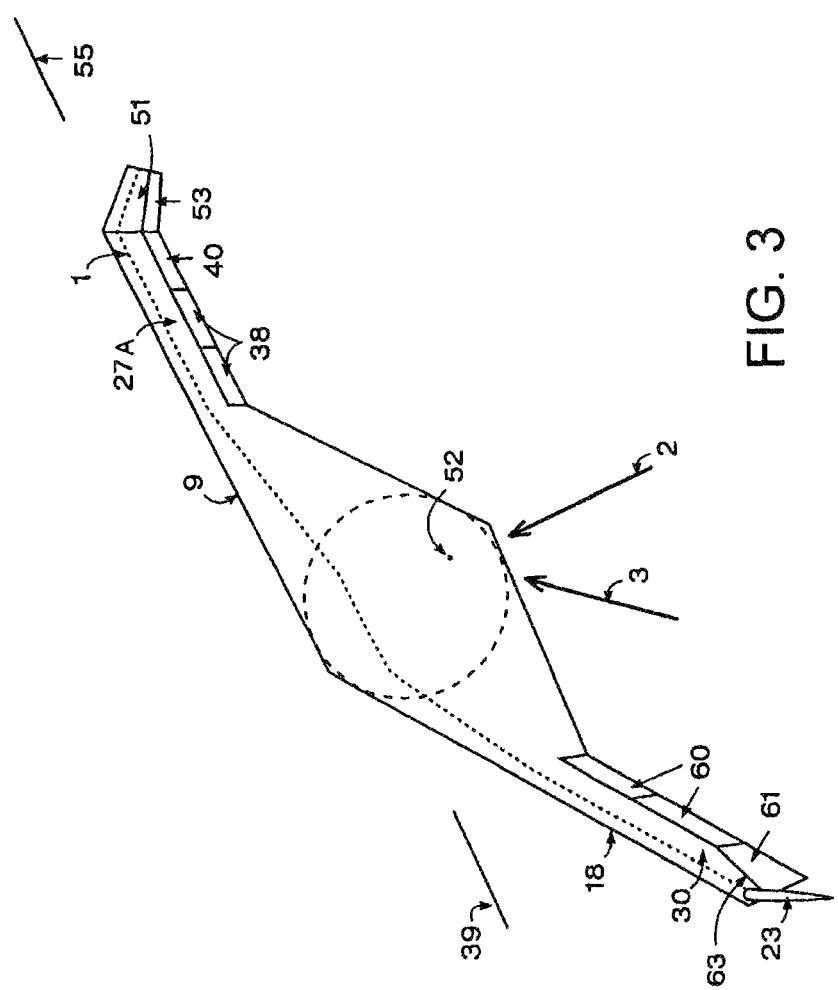
FIG. 3 is a plan view of another embodiment of the present invention.

FIGS. 2 and 3 show two different sweep angles for alternative aft swept wing configurations 29 and 30. Aft swept wing configuration 29 shown in FIG. 2 has the same or close to the same sweep angle as forward swept wing 27 and thus both wings can be swept just behind the mach cone so the air and wing is interacting very similar to how they would interact in subsonic flight with little or no shock waves, and yet achieve the largest aspect ratio for lowest induced drag. Aspect ratio is the wingspan squared divided by the planform area of the wing. The configuration of FIG. 2 probably represents the lowest desirable sweep angle for the aft swept wing.

The alternate aft swept wing configuration 30 shown in FIG. 3 however is generally lower risk from a pitch stability and control standpoint since the vehicle is generally more stable in pitch because the aerodynamic center of pressure of the aft swept wing 30 is farther aft and potentially the center of gravity of the vehicle can be farther back for the same level of inherent and artificial stability. Aft swept wing 30, as shown in FIG. 3, also places elevon control surfaces 60 and 61 farther aft behind the pitch axis 39 so that they have a larger moment arm for providing pitch control for the vehicle. In FIG. 3, the hinge line 63 for elevon 61 is shown at a lower sweep angle than the aft swept wing 30 in order to make the elevon 61 more effective aerodynamically. As can be seen, the hinge line 63 is still swept more relative to the high speed direction of flight 3 than the forward swept wing 27A so that it is still swept behind the mach cone.

More highly swept wing 30 as shown in FIG. 3 will generally be easier to design to handle the widely varying upwash angles generated by the center body 25 and forward swept wing 27A without stalling. However, the lift curve slope or change of lift co-efficient as a function of angle of attack will be steeper for aft swept wing 29 than it will for wing 30 because of the lower sweep angle which will tend to reduce the pitch stability differences between the two configurations as long as wing 29 is kept from stalling. If a vertical fin 23 is used, then aft swept wing configuration 30 also provides more vertical tail volume for the same size vertical fin 23. Aft swept wings with sweep angles different from that of wings 29 and 30 are of course also possible but will generally be between these two configurations. The increased sweep angle for the leading edge 18 of the aft swept wing 30 relative to the leading edge 9 of the forward swept wing 27 should be less than 80 degrees, and preferably less than 75 degrees, minus the maximum design sweep angle in high speed flight of the leading edge 9 of the forward swept wing 27.

B. Achieving Low Compressibility Drag Characteristics

The current invention achieves low compressibility drag which is the drag associated with going close to or over the speed of sound ("transonic speed") where the air acts like a compressible gas. Compressibility drag is kept low by having the airfoils swept in one direction from one end of the vehicle to the other to keep the isobars, or lines of constant pressure, swept in one direction similar to previous oblique wings. However this invention differs from previous oblique wings in that there is a more rapid buildup in thickness, chord and volume near the vehicle centerline. Relative to the forward swept wing 27, and unlike previous oblique wings, the sweep angle of the quarter chord line 1 (shown in dotted line and shows the points one quarter of the way from the leading edge to the trailing edge of the airfoil) and the half chord line preferably increases in the transition areas 13 and 15 on either side of the centerline of the center body 25 where the chord and thickness of the airfoil is more rapidly tapering up or down. The increased sweep angle of the quarter and half chord lines tends to compensate for the increased compressibility drag due to volume that might otherwise be associated with this more rapid tapering up or tapering down of volume. The increased sweep gives the air more time to move out of the way of the increasing cross-sectional area. In the preferred embodiments as shown in FIGS. 2 and 3, the quarter chord is more swept in the forward swept transition area 15 because the trailing edge 19 is heavily swept aft while the leading edge 9 maintains the same sweep angle as the forward swept wing 27 and 27A. Also the quarter chord is more swept in the aft swept transition area 13 because the leading edge 17 is heavily swept aft while the trailing edge 21 stays at a modest sweep angle close to that of the leading edge 9 of the forward swept wing 27 or 27A. Even greater chord sweep angles could be achieved for example by increasing the sweep of both leading 9 and trailing edges 19 in the forward transition area 15. A modified half chord line 1', as shown in FIG. 2, (showing a line created by points half way between the forward and aft edges of the airfoil as laid out perpendicular to the lead edge of forward swept wing 27) could also be drawn on FIG. 3 and would have a similar appearance to the quarter chord line but would better represent the average shape between the leading and trailing edges of the vehicle. For the configurations shown in FIGS. 2 and 3, the modified half chord line is swept just over 20 degrees more in the forward 15 and aft 13 transition areas than in the forward swept wing 27. This increased sweep angle for a high speed aircraft should be over 10 degrees and preferably over 15 degrees. For a lower speed vehicle the increased sweep angle tends to actually be higher and is made possible by the fact that the forward swept wing doesn't operate to as high a sweep angle. For a lower speed vehicle the increased sweep should be over 20 degrees and preferably over 25 degrees, with over 30 degrees approaching a practical limit.

To reduce compressibility drag further the vehicle is preferably area ruled. A NACA researcher named Dr. Richard Whitcomb discovered that the wave drag is related to the second-derivative (or curvature) of the volume distribution of the vehicle. The lowest wave drag occurs with a Sears-Haack area distribution where the curvature of the volume distribution is minimized. Although area ruling is less critical with an Oblique wing it is still beneficial. Area ruling by adjusting the airfoil thicknesses makes it possible to retain the low radar cross section design associated with only two sets of parallel lines to describe the outline of the vehicle in plan view as shown in FIGS. 2 and 3 that otherwise might cause larger curvature of the volume distribution than desired at certain areas like at the connections of the wings 27 and 29 to the transition areas 15 and 13.

C. How to Establish the Wing and Center Body Incidence

This aircraft is very unusual because of the highly unsymmetrical nature of the vehicle. As a result, the left and right sides of the vehicles can be dramatically different. To establish the wing incidence one should start off with the aircraft in its low speed, low sweep orientation. For the configuration shown in FIG. 2, there is no need for the vehicle to rotate past the point where both wings 27 and 29 are at right angles to the direction of flight. As a result, the quarter chord line 1 of the forward swept wing 27, even when the aircraft is at its lowest sweep angle, is forward of the chord line 1 of the aft swept wing 29 and center body 25. As a result, the center body 25 generally will be flying in the upwash from the forward swept wing 27. Also the aft swept wing 29 or 30 will be flying in the upwash from both the center body 25 and the forward swept wing 27/27A. It is desirable to have an elliptical distribution of lift across the wingspan of the aircraft with the trailing edge flaps as close to neutral as possible for minimum drag. To achieve this the forward swept wing 27, as shown in FIG. 5 in exaggerated form, is given the highest incidence 26 relative to center body 25 because it doesn't have the benefit of the upwash from the other surfaces and also has to operate at a much higher wing loading relative to the large chord centerbody 25 in order to achieve an elliptical distribution of lift across the wingspan of the vehicle. Depending on the design the aft swept wing 29 or 30 may have a negative incidence 28 relative to the center body 25. The aft swept wing 29 or 30 has the benefit of flying in the upwash of both the center body 25 and the forward swept wing 27/27A so depending on the particular design it might need a lower incidence to create the same amount of lift. However countering this, like the forward swept wing 27, the aft swept wing 29 or 30 also has a much smaller chord than the center of the center body 25 and thus must have a much higher wing loading in order to achieve an elliptical distribution of lift across the entire vehicle.

It also can be beneficial for the center body 25 airfoil to be a reflex airfoil in order to provide a positive vehicle pitch-up moment for trimming the vehicle with a farther forward center of gravity for increased stability. Because of the large chord of this center body 25, this can be achieved without risk of overloading and stalling the leading edge. The aft swept wing 30 shown in FIG. 3 will generally need more positive incidence than will the aft swept wing 29 arrangement shown in FIG. 2 because of its more highly swept design. Balancing of the lift between the forward and aft swept wings with minimal control surface deflections on the configuration shown in FIG. 3 can be more easily achieved with just curvi-linear dihedral as described below than it can for the configuration shown in FIG. 2 which is more likely to require different incidence angles between the forward and aft swept wings 27 and 29.

D. How to Establish the Wing Dihedral

Figure 4:
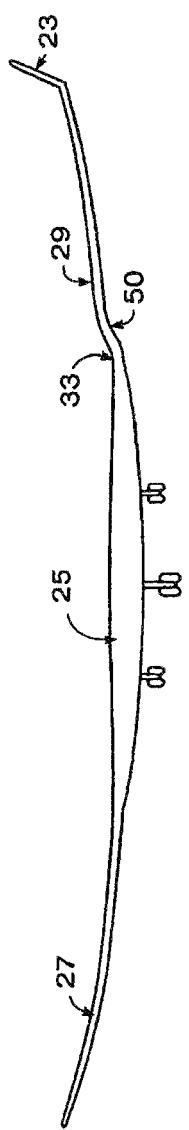
FIG. 4 is a view looking aft at the embodiment of the invention shown in FIG. 2 in low speed configuration perpendicular to the leading edge 9 of the forward swept wing 27 and center body 25.

Once the wing incidence for low speed flight has been established that achieves the closest thing to an elliptical distribution of lift across the wingspan with the control surfaces in a neutral position, the configuration can be swept to the highest sweep position and wing curvi-linear dihedral can be used to again achieve an elliptical distribution of lift. This is done as follows; At this high sweep angle, generally the farther forward on the vehicle the more the wing needs to be increased in angle of attack in order to generate sufficient lift. Also, the farther aft the more the wing needs to be reduced in angle of attack because this section of the wing is flying in the upwash of all the wing sections in front. This can be achieved by having the dihedral similar to that shown in FIG. 4 which is a view of the aircraft in FIG. 2 looking aft perpendicular to the pitch axis 39. Looking to the left on the frontal view of the aircraft in FIG. 4, the center body 25 and the forward swept wing 27 slowly curves up with more and more dihedral. When the wing is swept relative to the direction of travel, the increasing dihedral angle the farther outboard/forward effectively provides increasing angle of attack at that point on the airfoil to compensate for the effect of wing sweep. Looking to the right, the center body 25 and the aft swept wing 29 generally also curve up more and more in a curvi-linear dihedral. When the wing is swept, because of the swept angle of the aft swept wing 29, increasing dihedral angle results in a reduction in the angle of attack of the local airfoil to compensate for the increased relative lift that would otherwise occur due to the upwash from the forward 27 and center 25 wing sections. The larger sweepback angle of the quarter chord 1 on the aft facing transition area 13 and aft facing wing 30 can also act to reduce the roll effect associated with increasing vehicle sweep angles and thus reduce the required amount of dihedral on these portions of the aircraft. Use of dihedral could also be used to solve local upwash problems if found necessary or desirable. For example if during high speed for a particular design the transition from the highly swept leading edge 17 to the more modest sweep of leading edge 31 for aft swept wing 29 for the configuration shown in FIG. 2 caused a locally high upwash and thus higher than desired angle of attack at the wing root of wing 29, the dihedral could be increased significantly in this area where the wing 29 meets the transition area 13 as shown in exaggerated form in FIG. 4 at point 33. If the upwash effect of this transition area is less outboard from this point the dihedral angle might drop as shown in exaggerated form at point 50 in FIG. 4 in order to maintain the proper distribution of lift along the span. Although this is not anticipated to be a problem, if it were a problem then leading edge flaps might be located at point 33 on the root of wing 29 to prevent stall from the potential high angle of attack air coming off the highly swept leading edge 17 of the transition area 13 during high g maneuvers.

As the vehicle pulls positive g's while maneuvering, the wings can tend to bend up to higher angles effectively creating greater dihedral angles since the vehicle isn't necessarily a pure spanloader where the weight is distributed exactly where the lift is. Theoretically if the wing stiffness and mass distribution of the vehicle is just right, the wing deflections acting like increased dihedral can compensate for the greater upwash airflows generated by the maneuvering and thus smaller control surface movements would be required to retrim the aircraft at a particular design airspeed.

E. How to Achieve Yaw Stability and Control

In the embodiment of FIG. 2, a vertical fin 23 provides yaw stability for the vehicle at the highly swept angle used in high speed flight where the vehicle is flying in direction 3. When a vertical fin 23 is used for yaw stability and control it rotates about a primarily vertical axis and remains pointing generally in the direction of flight. Because the aft swept wing 29 or 30 is flying in the upwash from the center body 25 and forward swept wing 27/27A, wing 29 or 30 tends to experience less drag than the forward swept wing 27/27A. On previous Oblique wing aircraft this caused a significant yaw moment that was difficult to handle. The embodiment of the current invention shown in FIG. 2 has less of a problem in that regard in that the chord line 1 of the forward swept wing 27 is now forward of the chord line of the aft swept wing 29 so that the inboard wing forces associated with wing dihedral, spaced a significant distance apart fore and aft, generates a yawing moment in the opposite direction to partially or fully eliminate this effect. The configuration shown in FIG. 3 with aft swept wing 30 can also tend to limit this yawing effect because the increased upwash on the aft swept wing 30 relative to the forward swept wing 27A can be partly or fully compensated by the larger swept back angle of the wing 30 versus wing 29 and thus lower aspect ratio.

Another way to counter the traditional yawing effect of an oblique wing aircraft is to place the center of thrust 52 of the engines behind the vehicle center of gravity on the center body 25 as shown in FIG. 2. With this approach, as the vehicle yaws counter-clockwise for high speed flight, the engine thrust line 37 ends up moving to the right relative to the vehicle center of gravity near 25 as shown in FIG. 2. With the engine exhaust exiting the aircraft behind the vehicle center of gravity at point 52, thrust deflectors can also be used to generate yawing moments. For configurations where the engines are mounted in a fixed position in the center body 25, thrust deflectors are needed anyway to adjust for the changing sweep/yaw angles of the vehicle used from low to high speed flight and keep the engine exhaust pointed primarily aft. Another approach is of course to have two engines spaced laterally from each other and to vary the thrust between the two engines to counter the yaw forces. In high speed, a vertical fin 23 mounted on the aft swept wing 29 or 30 provides a lot of tail volume and a powerful yaw control system. If the wing still tends to want to yaw to lower sweep angles, it is advantageous to locate more, if not all, of the vertical fin 23 above the wing 29 because if it is generating an inward force countering this yawing effect, it will also act as a winglet to improve the efficiency of the aft swept wing 29 or 30. Having the vertical fin above the wing 29 also will of course help with ground clearance on landing. A winglet to be most effective needs to generate an inboard force for the area located above the wing and an outboard force for the area located below. Proper balancing of the area above and below the wing is desirable to make the vertical tail 23 operate the most efficiently as a winglet. The more the wings want to unsweep, the more vertical tail 23 area is desired above the wing 29 and vice versa.

It should be noted that if a line describing the centerline of an inboard oriented force from the vertical fin 23 passes over the pitch axis 39 of the vehicle, the vertical fin 23 will be generating a vehicle pitch up moment. The reverse occurs if the centerline of vertical fin forces passes under the pitch axis of the vehicle or for fin forces in the opposite direction. This is a further coupling of axes which is significant when the vehicle is at a highly swept angles for high speed flight.

To decouple vertical fin 23 forces from vehicle pitching moments as much as possible, the vertical fin 23 can be canted outboard so that the vertical fin 23 generates forces pointed more closely to a line passing through the vehicle pitch axis when the vehicle is at high sweep angles.

At low speed and low aircraft sweep angles, the vertical fin 23 may not be located far enough behind the aircraft center of gravity to provide all the necessary yaw control by generating side forces alone. Under these conditions the aircraft can use drag devices like ailerons that split into an upper and lower segment like the B-2 to increase drag on one side or the other of the aircraft. The vertical fin 23 in combination with an adjacent aileron 35 can also be positioned to create drag such as rotating the fin 23 counterclockwise from its position shown in FIG. 2. This will cause the fin 23 to stop operating as a winglet thus increasing wing drag and reducing wing lift. The aileron 35 could then be deflected trailing edge down to compensate for the reduced lift and to generate more drag as well.

In this low sweep position the vertical fin 23 can also be helpful in providing a direct side force capability to make it easier for the pilot to maneuver onto a runway without having to bank the aircraft and potentially allowing a shorter landing gear with less fear of wingtip strikes on the runway.

F. How to Achieve Pitch Control

Pitch for this aircraft is defined as rotation about axis 39 as shown in FIGS. 2 and 3. The configuration shown in FIG. 3 uses a relatively straightforward elevon control system. However because of the unusual definition of the pitch axis 39, the left elevon 61 of wing 30 provides closer to pure pitch control and right elevon 40 provides closer to pure roll control.

The configuration shown in FIG. 2 is more challenging and unusual. Trailing edge flaps 41 and 43 can be used to pitch the aircraft in the same manner used on previous Oblique flying Wing aircraft. Deflecting the trailing edges up causes a reduction in lift behind the vehicle center of gravity causing the vehicle to pitch nose up and vice versa. In addition, if more pitch power is required, deflecting flaps 36 and aileron 35 trailing edge up will cause more nose up pitching moment. In order to counter the left roll that this normally would cause, aileron 40 (and potentially also flaps 38 and 42) could also be deflected trailing edge up. Flap 42 has little or no effect on pitch but does help to counter the roll. Although the forces generated by flaps 38 and aileron 40 are actually slightly ahead of the pitch axis 39 through the center of gravity of the vehicle and thus actually generate a nose down moment, it is much less powerful than the pitch up moment from surfaces 35 and 36. A pure nose up pitching moment with these control surfaces can of course be generated in other ways such as inboard flap 36 deflected trailing edge up and aileron 35 deflected modestly the opposite direction to cancel out the roll effect.

Figure 6:
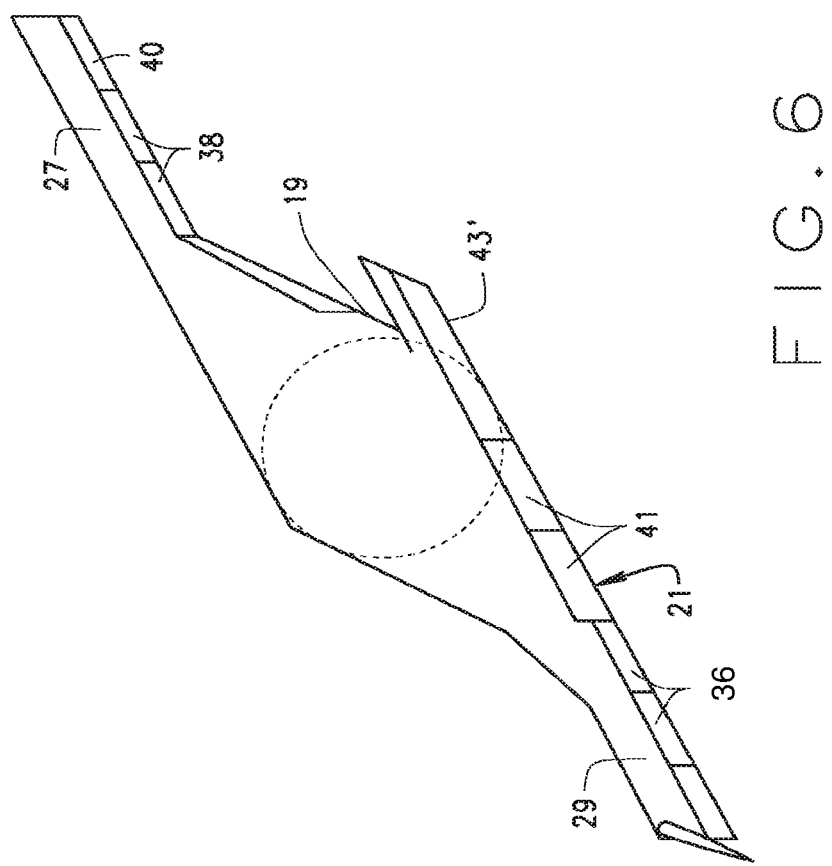
FIG. 6 is a plan view, corresponding to FIG. 2, of a modification of the first embodiment.

Pitch control can also be augmented in other ways such as engine thrust vectoring. Deflecting engine exhaust up behind the center of gravity will generate a fuselage pitch up moment. Engine exhaust blowing over the top or bottom of trailing edge flap 43 and 41 can increase the effectiveness of these flaps. If more pitch stability and control power is desired, flap 43 could be enlarged by extending it out to the right so that the right end of flap 43' is cantilevered out to the right of the line of the trailing edge 19 as shown in FIG. 6. The center of pressure effect of this expanded flap area to the right of the trailing edge 19 is far aft of the vehicle pitch axis 39 and center of gravity and because it is to the right of the vehicle center it also acts to counter the roll effect of flaps 36 when used for pitch control. More pitch stability can be achieved by moving the center of gravity of the vehicle farther forward and using a reflex airfoil on the center body 25 in order to retrim the vehicle with enough nose up pitching moment and still carry enough lift with the aft swept wing 29 to get the optimum elliptical distribution of lift across the full wingspan of the aircraft. In general, for the present invention, a reflex airfoil on the centerbody 25 is preferred.

When the aircraft is flying at a swept angle, the vertical fin 23 can also generate pitching moments about the pitch axis. Normally, for most aircraft, coupling between controls is not considered desirable and the pitch effect of the vertical fin 23 (if located only above or below the wing 29) can be reduced by canting it outboard so its force which otherwise would tend to produce a nose up or down moment respectively is cancelled out by its lifting force behind the center of gravity which causes an opposing nose down or up moment respectively. However by having an upper and lower rudder the aircraft could move the rudders differentially to create vehicle pitching moments if that were desired while neutralizing vehicle yawing moments.

G. How to Achieve Roll Control

The roll axis for this aircraft is defined as perpendicular to the pitch axis 39. Roll control is achieved similar to other aircraft with the use of ailerons 35 and 40 which can be augmented if necessary by flaps 38 and 36. Since surfaces 35 and 36 have more of a pitch effect on the aircraft than surfaces 38 and 40, flaps 41 and 43 could act opposite to surfaces 35 and 36 to cancel out the pitch effect. Alternatively only aileron 40 might be used for small roll adjustments since it has little effect about the pitch axis 39.

H. Engine Integration

The engines can be located in pods under, or over, the wing that rotate to keep the engine pointed into the relative wind, or the engines can be built into the center body 25. When the engines are built into the wing, the intakes and exhaust nozzles have to be able to operate at the different aircraft yaw/sweep angles. Numerous thrust vectoring nozzles have been developed such as those on the F-22 Raptor and the V/STOL version of the Joint Strike Fighter that could be utilized in a similar approach on this vehicle. Air intakes have also been built to efficiently take in air from different directions as would be required for engines built into the wing in this invention. The F-15 Eagle is such an example where the intake ramp rotates down approximately 45 degrees to intake air efficiently with the aircraft at different angles of attack. Simpler engine intake configurations for this application would be possible since the aircraft generally won't be flying supersonically at a low sweep angle and generally won't be flying slow in a high sweep angle. It is generally easier to integrate jet engines inside the wing of this Oblique Flying Wing than previous Oblique Wing Aircraft because of the greater depth and length possible with the large chord center body 25. Otherwise the engine integration in this invention is similar to those proposed in earlier Oblique All Flying Wings.

I. Pitch and Roll Stability

FIG. 2 shows a dotted ¼ chord line 1 for this vehicle with aft swept wing 29. The quarter chord line 1 of the forward swept wing 27 and its transition area 15 are less distance in front of the pitch axis 39 than the quarter chord of the aft swept wing 29 and its transition area 13 are behind the pitch axis 39. Also the aft swept structures 29 and 13 are flying in the upwash from everything in front and they also have a winglet/vertical fin 23, so when a gust comes along they tend to gain more lift than the forward swept structures 15 and 27. All of these factors contribute to the pitch stability of the vehicle. In a flight of a demonstrator aircraft having ballast that could be moved forward or aft to vary the center of gravity position, the aircraft was successfully flown with centers of gravity between and including 31% and 39.5% chord on the centerbody. This is a remarkably far aft center of gravity. However to further improve on the stability, the forward swept wing 27 can be modified to pick up less lift with vehicle angle of attack. For example, 45 degree composite plies in the top skin of the wing 27 and minus 45 degree plies in the bottom skin can cause the wing 27 to twist leading edge down when the wing 27 is deflected up either from a gust or from the vehicle pitching up. Another way to achieve the same result is to add a wingtip 51 as shown in FIG. 3, whose center of pressure is behind the elastic axis 55 of the wing 27A, so when the wing hits a gust or the vehicle pitches up, the wing will twist leading edge down. This acts as a natural gust alleviation system and also increases vehicle pitch stability. This wingtip 51, because it is unswept in high speed flight, would be a very thin structure like an F-104 wing to minimize compressibility drag. Its other benefit is that it increases the wetted aspect ratio of the vehicle at high sweep angles by increasing the wing span. A thin wing is heavier than an equivalent thick wing but because the wingtip 51 is a short structure with relatively low bending loads the impact is minimal and achieves the same wingspan increase when the vehicle is at a highly swept angle of a significantly longer in-line extension of the wing 27A which would have more surface area and possibly more weight. In addition, by actively controlling an aileron surface 53 on this wingtip 51 the wing 27A can be actively twisted down to counter an up gust of air. Also having the aerodynamic center of the wingtip 51 behind the elastic axis 55 of the wing 27A provides damping and twist stability to the wing 27A. The aileron 53 also can be actively driven to provide additional damping of the wing 27A twist to delay the onset of flutter and to offset the de-stabilizing coupling that the offset wing tip creates between torsion and bending modes of the wing. A sensor to detect air gusts in advance and an accelerometer and rate gyro near the wingtip can be used in a closed circuit control system to try to minimize vertical accelerations at the wingtip and provide a damping force for torsional motion. Minimizing vertical accelerations at the wingtip should also help the ride quality of the entire vehicle. For a wing 27A that isn't very stiff in torsion, the aileron 53 will always work counter to a conventional aileron in that additional lift on the aileron 53 causes the wing to twist leading edge down resulting in a net loss instead of gain in lift. However the control surfaces 40 and 38 just inboard of the wingtip 51 still works in a conventional manner like ailerons and the wingtip aileron 53 can be used to prevent twisting of the wing that usually causes control reversal for jet transports at high speed. It should be understood that the forward swept wing wingtip extension 51 shown in FIG. 3 could be used on the configuration shown in FIG. 2. It will also be understood that the more conventional forward swept wing design 27 shown in FIG. 2 could also be used on the configuration shown in FIG. 3.

It will also be understood that the aircraft could have a system like the B-2 bomber that can move fuel between forward and aft tanks to precisely control the center of gravity of the vehicle at all but a zero fuel state.

J. How to have a Stable Platform on the Ground Yet Still be Able to Rotate for Takeoff There are several ways to allow the aircraft to be very stable while sitting on the ground on its landing gear yet be capable of rotating easily for takeoff. This vehicle already has better stability on the ground than previous OAW (Oblique All Wing) aircraft since the vehicle is spread farther fore and aft relative to the pitch axis 39 allowing a longer potential wheel base and a greater pitching moment capability. The vehicle also has a smaller moment of inertia in the roll and yaw axis because of a smaller wingspan and the weight of the vehicle being more concentrated near the centerline.

The use of the vertical fin 23 for direct side force could be used so the aircraft doesn't have to bank significantly on landing and as a result can have a shorter landing gear. Also engine thrust could be used to assist in pitching up the aircraft for takeoff either with a thrust line below the vehicle center of gravity or by deflecting the engine exhaust up behind the aft landing gear bogies. Another approach is to have one or more landing gear struts situated well behind the vehicle center of gravity to provide good stability on the ground but which can be fully or partially retracted during the takeoff roll, before the other landing gear struts, to allow easy rotation. A wide landing gear spacing is generally preferred if the runways and taxiways will accommodate it for better stability on the ground and also so it is less likely that the aft swept wingtip will contact the ground especially since it may be desirable to have some of the vertical fin/winglet 23 extend below the wing.

If the vehicle has all steerable landing gear bogies the aircraft could taxi in its lengthwise direction making it possible to get into tight spaces and allowing the aircraft to be densely parked next to other similar aircraft.

The current invention also has other potential advantages. At high speed the aircraft could yaw to a low sweep angle in order to potentially achieve high maneuverability and high compressibility drag such as during air to air combat to slow down and turn rapidly to force an adversary to overshoot its position. Also at low speed the aircraft could yaw to a high sweep angle to increase induced drag such as during an approach to landing to achieve a steeper glide slope angle. The aircraft could also potentially handle cross wind landing better than other aircraft.

Although an all-wing aircraft has been shown and is much the preferred embodiment of this invention, it should be stated that this invention is also applicable to an oblique wing and fuselage configuration as well. In that case a fuselage is preferably mounted under the oblique wing of this invention similar to previous oblique wing/fuselage aircraft.

Numerous other variations in the aircraft of the invention, within the scope of the appended claims, will occur to those skilled in the art in light of the foregoing disclosure. As various changes could be made in the above constructions without departing from the scope of the invention, it is intended that all matter contained in the above description or shown in the accompanying drawings shall be interpreted as illustrative and not in a limiting sense.

The invention claimed is:

1. An oblique wing aircraft designed for reduced surface area to volume ratio, said aircraft having an oblique wing comprising:
   a forward swept wing segment on one side of the wing and an aft swept wing segment on the opposite side of the wing and characterized by further comprising:
   a center oblique airfoil section connecting said forward and aft swept wing segments, said center oblique airfoil section having a larger maximum chord length than a maximum chord length of either of said forward or aft swept wing segments; the chord length of said center oblique airfoil section tapering down more rapidly than said forward or aft wing segments as said center oblique airfoil section extends outboard toward said forward and aft swept wings; wherein said center oblique airfoil section is not shaped solely to function as a circular fairing to fill a gap between an oblique wing and a fuselage at different oblique wing angles; wherein said center airfoil section is not a second wing in an X wing configuration; wherein said aircraft is designed to reduce drag by flying at higher yaw angles when flying at or above transonic speed, and wherein said center oblique airfoil section contains the majority of the aircraft volume.

2. The oblique wing aircraft of claim 1 where the leading and trailing edges of the oblique wing excluding the wingtips are swept in the same direction relative to the direction of flight.

3. The oblique wing aircraft of claim 1 where the forward and aft swept wing segments and center oblique airfoil section are the only significant wing or pitch control airfoils for the aircraft.

4. The oblique wing aircraft of claim 1 wherein an airfoil section extends up from the aft swept wing to assist in yaw stability and control of the vehicle.

5. The oblique wing aircraft of claim 4 where said airfoil section extending up from the aft swept wing also acts as a winglet to increase efficiency.

6. The oblique wing aircraft of claim 1 wherein a propulsion system for the aircraft is mounted inside the center oblique airfoil section.

7. The oblique wing aircraft of claim 1 wherein the aircraft deflects main propulsive engine exhaust to produce at least one of yaw moments and pitch moments.

8. The oblique wing aircraft of claim 7 wherein the engine exhaust is deflected up or down to assist in pitch control of the aircraft.

9. The oblique wing aircraft of claim 1 wherein the tapering down of said center oblique airfoil section occurs over a majority of the span of said center oblique airfoil section.

10. The oblique wing aircraft of claim 1 where the majority of a modified half chord line of said center oblique airfoil section is swept more than 10 degrees more than a modified half chord line of the forward swept wing segment.

11. The oblique wing aircraft of claim 10 where the majority of a modified half chord line of said center oblique airfoil section is swept more than 15 degrees more than a modified half chord line of the forward swept wing segment.

12. The oblique wing aircraft of claim 10 where the majority of a modified half chord line of said center oblique airfoil section is swept more than 20 degrees more than a modified half chord line of the forward swept wing segment.

13. The oblique wing aircraft of claim 1 wherein at least one circle drawn over the plan view of said aircraft has an interior fully within the plan view outline of said aircraft and encompassing more than 25% of the total planform area of said aircraft.

14. An asymmetric aircraft, said aircraft comprising a center wing section and left and right outboard primary wing segments, said center wing section having a long axis, said long axis connecting said left and right outboard primary wing segments, said center wing section having a larger chord length near the centerline of said center wing section than the chord length of either of said left or right outboard primary wing segments; the ends of said center wing section having a left and right transition area, wherein the chord lengths of said transition areas taper down more rapidly than the taper rate from the wing root to, but not including, the wing tip of said left or right outboard primary wing segments as said center wing section extends outboard toward said left and right outboard primary wing segments; the majority of the volume of said aircraft being in said center wing section; said aircraft having a plan view layout wherein a straight line extending inboard from a point on the leading edge of one of said outboard primary wing segments at the 80% span position of said wing segment and extending through the leading edge at the 20% span position of said wing segment does not intersect a line constructed in the same manner on the other wing segment within the left and right boundary of the aircraft relative to the direction of flight.

15. The oblique wing aircraft of claim 14 wherein at least one circle drawn over the plan view of said aircraft has an interior fully within the plan view outline of said aircraft and encompassing more than 25% of the total planform area of said aircraft.

16. The oblique wing aircraft of claim 1 wherein at least one circle drawn over the plan view of said aircraft has an interior fully within the plan view outline of said aircraft and encompassing more than 33% of the total planform area of said aircraft.

17. An oblique wing aircraft designed for reduced surface area to volume ratio, said aircraft having an oblique wing comprising: A forward swept wing segment providing half the aircraft wingspan and an aft swept wing segment on the opposite side of the aircraft providing the other half of the aircraft wingspan, the leading and trailing edges of said forward and aft swept wing segments from the centerline out to the 80% wingspan are all swept in the same direction relative to the direction of flight, the leading and trailing edge sweep angles at the 80% wingspan locations are all smaller than the maximum sweep angle of the leading edge of the aft swept wing inboard of the 80% wingspan position and also smaller than the maximum sweep angle of the trailing edge of the forward swept wing inboard of the 80% wingspan position.

18. The oblique wing aircraft of claim 17 wherein at least one circle drawn over the plan view of said aircraft has an interior fully within the plan view outline of said aircraft and encompassing more than 25% of the total planform area of said aircraft.

19. The oblique wing aircraft of claim 17 wherein at least one circle drawn over the plan view of said aircraft has an interior fully within the plan view outline of said aircraft and encompassing more than 33% of the total planform area of said aircraft.

20. The oblique wing aircraft of claim 17 wherein at least one circle drawn over the plan view of said aircraft has an interior fully within the plan view outline of said aircraft and encompassing more than 40% of the total planform area of said aircraft.

21. The oblique wing aircraft of claim 1 wherein the forward swept wing segment has a wingtip whose center of pressure is behind the elastic axis of the forward swept wing segment.

22. The oblique aircraft of claim 1 wherein the wingtip of the forward swept wing segment has a control surface used to control twisting of the forward swept wing segment.

* * * * *